United States Patent [19]

Hiles

[11] Patent Number: 4,476,258

[45] Date of Patent: Oct. 9, 1984

[54] ENERGY ABSORBING POLYURETHANE COMPOSITIONS

[75] Inventor: Maurice A. F. Hiles, Munroe Falls, Ohio

[73] Assignee: National Research Development Corporation, London, England

[21] Appl. No.: 480,493

[22] Filed: Mar. 30, 1983

[51] Int. Cl.³ .................. C08L 75/08; C08G 18/38
[52] U.S. Cl. .................. 523/212; 428/423.1; 428/425.9; 523/214; 523/218; 523/219; 524/710; 524/711; 524/773; 524/775; 524/779; 524/780; 524/781; 524/783; 524/785; 524/847; 528/76; 528/77; 528/85
[58] Field of Search ............ 523/212, 214, 218, 219; 524/700, 710, 711, 773, 775, 779, 780, 781, 783, 524/784, 785, 847; 528/76, 77, 85; 428/432.1, 425.9

[56] References Cited

U.S. PATENT DOCUMENTS 3,248,371 4/1966 Damusis .................. 528/77
4,281,096 7/1981 Nomura et al. .......... 528/76
4,346,205 8/1982 Hiles .

Primary Examiner—Maurice J. Welsh
Attorney, Agent, or Firm—Finnegan, Henderson, Farabow, Garrett & Dunner

[57] ABSTRACT

Energy absorbing polyurethane elastomer compositions having a density of from about 0.4 to about 1 gm/cc, a compression set of less than about 5% and a recovery time of from about 10 to about 100 milliseconds containing a light-weight filler are formed by reaction of a urethane-forming component comprising a compound containing at least four urethane-forming reactive sites and capable of forming stable complexes through unsatisfied urethane-forming reactive sites, an elasticizing polyol selected from the group consisting of diols and triols, and a diisocyanate in less than stoichiometric amounts.

38 Claims, No Drawings

ENERGY ABSORBING POLYURETHANE COMPOSITIONS

BACKGROUND OF THE INVENTION

This invention relates to polyurethane elastomer compositions, and more particularly to polyurethane compositions having shock absorbing properties combined with relatively short recovery times. The materials are also particularly well suited for use in shock absorbing, sound damping and other applications in which absorption of energy applied in cycles of relatively short duration are required. The materials are particularly well suited for use as shock absorbing elements in footwear, such as soles and insoles for walking and running shoes.

In the act of walking, the foot of an average-size man decelerates with a force seven to eight times the normal force of gravity. In running, the deceleration increases to fifteen to twenty times the normal force of gravity. In walking, the deceleration occurs cyclically at about fifteen to forty millisecond intervals and at intervals of from 15 to 25 milliseconds in running. The mechanical implications, i.e., shock waves, associated with heel strike in running and walking are of major concern to medical practitioners.

It is thus seen that there is a need for a shock absorbing material capable of absorbing substantial shocks applied at 15 to 100 millisecond intervals, as are encountered in normal exercise and other similar environments.

Prior art viscoelastic polymers capable of dispersing considerable levels of kinetic energy suffer from two major disdvantages. They are comparatively heavy and their recovery rate is too slow. The ideal properties of an energy absorbing elastomer, and those attained in accordance with the present invention, are:

1. It must deform readily, for in this way it disperses the impacting forces over the maximum available area;
2. On compression, it should become progressively stiffer in bringing to a halt the downward movement of, for example, the heel;
3. During this deceleration phase, the absorbed energy must be dissipated by displacement; and
4. The elastomer has to recover at a rate slow enough not to exert a significant upward pressure when, to use footwear as an example, the foot is on the ground, thus eliminating reverberations, but fast enough to regain its shape before the next step.

Moreover, such elastomers, and those formed in accordance with the present invention, must function effectively when subjected to multidirectional forces. They must be light in weight, be dimensionally stable at ambient temperature and have a very low compression set.

In order to achieve these properties, the polymer must be three dimensional, but must be very loosely bonded to achieve maximum distortion and acquire some of the physical properties of a liquid in order to achieve the low magnitude of compression set required.

Such a material has not been satisfactorily provided by the prior art. Polyethylene foams used as insoles in running shoes, for example, typically have a compression set measured according to ASTM standard test 395, method B, of about 25 to 30%. However, after three or four days of use, such foams are typically permanently compressed by an amount equal to nearly 70% of their original thickness, with an attendant decrease in shock absorbing capacity. The importance of a relatively low compression set to such shock absorbing materials is thus graphically illustrated.

As above noted, it is also imperative that shock absorbing materials for use in applications such as footwear be light in weight so as not to impede unduly the normal walking or running function. The density of such materials should be less than one gram per cc and greater than about 0.4 gram per cc, preferably from about 0.6 to about 0.7 grams per cc.

Properties such as those outlined above in conjunction with shock absorbing materials for footwear are also of significant value in absorption of industrial impact, for use as bumper stops, vibrational mounts, etc. Moreover, such a material would have substantial application as an acoustic damping material, particularly at low frequencies, e.g., below 500 Hz, and also at very high frequencies, e.g., above 10 KHz. Such acoustic damping properties are particularly significant in so-called constrained layer dampers, wherein a mobile center damping material is sandwiched between stiff outer surface materials.

SUMMARY OF THE INVENTION

It has been discovered that a polyurethane elastomer composition having a density of from about 0.4 to about 1 gram per cc, a compression set of less than about 5% and a recovery time of from about 10 to about 100 milliseconds having particular utility as an energy absorbing medium can be prepared. Such polyurethane elastomer compositions contain a reinforcing lightweight filler material and are the reaction products of a compound containing at least four urethane-forming reactive sites which are capable of forming stable complexes through unsatisfied urethane-forming reactive sites (hereinafter sometimes referred to as the "quadrafunctional reactant"), an elasticizing polyol, which may be either a diol or a triol, and a diisocyanate added in less than stoichiometric amounts. A portion of the elasticizing polyol may be replaced by a suitable plasticizer, and the reaction may be catalyzed by materials which also provide ionic species for stabilization of unreacted urethane-forming reactive sites through chelation.

The invention also is directed to a process for forming a polyurethane elastomer composition comprising the steps of: (1) mixing a compound having at least four urethane-forming reactive sites and capable of forming stable complexes through unsatisfied urethane-forming reactive sites, an elasticizing diol or triol, a plasticizer and a light-weight reinforcing filler material; (2) adding a diisocyanate in less than stoichiometric amounts, (3) allowing the formation of urethane linkages involving less than about 80% of the urethane-forming reactive sites on the quadra-functional reactant, and (4) stabilizing the remaining urethane-forming reactive sites by formation of complexes to provide a cured product having a density from about 0.4 to about 1 gram per cc, a compression set of less than about 5% and a recovery time of from about 10 to about 100 milliseconds.

Soles and insoles for walking and running shoes formed from polyurethane elastomer compositions in accordance with the present invention are capable of reducing deceleration associated with heel strike in walking to about twice the force of gravity and in running to 4.5 to 5 times the force of gravity.

Additional objects and advantages of the invention will be set forth in part in the description which follows, and in part will be obvious from the description, or may be learned from the practice of the invention. The objects and advantages may be realized and attained by means of the instrumentalities and combinations particularly pointed out in the appended claims.

To achieve the objects and in accordance with the purpose of the invention, as embodied and broadly described herein, a polyurethane elastomer composition in accordance with the present invention may be formed by the reaction of one part of a compound containing at least four urethane-forming reactive sites and capable of forming stable complexes through unsatisfied urethane-forming reactive sites, preferably a tetrol; an elasticizing polyol selected from the group consisting of diols and triols, preferably diols; and a diisocyanate, preferably an aromatic diisocyanate, in less than stoichiometric amounts. The cured material also contains a reinforcing light-weight filler material, preferably silicon dioxide spheres, such as fly ash.

A portion of the elasticizing polyol component may be replaced by a plasticizer which reduces the normal intermolecular forces of the macromolecules, preferably an adipate, phosphate, or phthalate ester. The plasticizer may be present in amounts of from 0 to about 0.5, preferably about 0.25, parts by weight based on the quadra-functional reactant. The filler is present in amounts of about 0.2 to about 2, preferably about 0.5, parts by weight based on the quadra-functional reactant.

Diisocyanate is added in an amount such that the weight ratio of all other reactive components, plasticizer and filler to diisocyanate is from about 4:1 to about 10:1, preferably about 6:1 to about 7:1.

During and after reaction, the unreacted urethane-forming reactive sites are stabilized by complex formation, preferably by chelation with ionic species introduced either as part of a catalyst for urethane formation or separately from such a catalyst system. Preferably, at least 20% of the reactive groups capable of forming urethane linkages remain unreacted and stabilized in this manner.

DESCRIPTION OF THE PREFERRED EMBODIMENTS

Reference will now be made in detail to the presently preferred embodiments of the invention, which together with the following examples, serve to explain the principles of the invention. As used throughout this specification, references to ratios of components and percentages are by weight unless stated otherwise. Also as used herein, the term "compression set" refers to the percentage of permanent deformation caused by application on a practical compressive load in accordance with ASTM standard test 395, Method B.

The term "recovery time" as used herein refers to the time required for the material to return to its normal thickness (accounting for permanent deformation associated with compression set) following application of a practical load. Since the materials formed in accordance with the present invention have unusually short recovery times, standard ASTM testing specifications are not useable for this measurement. The measurement is conducted photographically by applying a practical load, i.e., 180 lbs. (the weight of an average man) to a sample of the polymer material 3/16 of an inch thick for the length of an average slow step—about 400 milliseconds. The compressive load is then removed and the material allowed to recover to its permanent thickness, which is somewhat less than its original thickness due to phenomena associated with the material's compression set. The whole procedure is photographed at 500 frames per second, and the number of frames exposed prior to return of the material to its permanent thickness allows calculation of the recovery time.

As noted above, polyurethane elastomer compositions in accordance with the present invention have a density from about 0.4 to about 1 gram per cc, a compression set of less than about 5% and a recovery time of from about 10 to about 100 milliseconds. The polyurethane elastomer compositions contain a reinforcing light-weight filler material and are the reaction product of a compound containing at least four urethane-forming reactive sites and capable of forming stable complexes through unsatisfied urethane-forming reactive sites, an elasticizing polyol selected from the group consisting of diols and triols, and a diisocyanate added in less than stoichiometric amounts.

A portion of the elasticizing polyol may be replaced by a plasticizer in some applications.

Preferably, the urethane-forming reactive sites on the quadra-functional reactant are hydroxyl or carboxyl, most preferably hydroxyl, groups. The urethane-forming reaction may be catalyzed by organic or organometallic catalysts.

In the preferred embodiment, the unreacted urethane-forming reactive sites are stabilized by chelation, as by chelation with ionic species. The ionic species may be introduced as part of an added catalyst system or may be added separately when an organic catalyst system is used.

In general, the filled polyurethane elastomer compositions formed in accordance with the present invention contain as the urethane-forming component one part quadra-functional reactant, about 1–3 parts elasticizing polyol, about 0.2–2 parts filler and 0 to about 0.5 parts plasticizer. A particularly preferred composition may be formed from about 1 part quadra-functional reactant, about 2 parts elasticizing diol, about 0.5 parts filler and about 0.25 parts plasticizer. As noted above, the compound containing at least four urethane-forming reactive sites and being capable of forming stable complexes through unsatisfied urethane-forming reactive sites may have as reactive sites either hydroxyl groups or carboxyl groups. Hydroxyl groups are preferred, and a particularly preferred compound of this sort is a tetrol. Tetrols useable in accordance with the present invention preferably have molecular weights of from about 170 to about 450.

Quadra-functional reactants formed from derivatives of ethylene diamine are particularly preferred. Such particularly preferred compounds are of the following general formula:

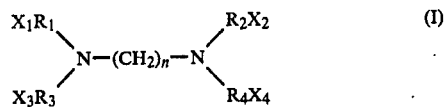

wherein n is an integer of from 1 to 4; $X_1$, $X_2$, $X_3$, and $X_4$, which may be the same or different, are hydroxyl or carboxyl groups; and $R_1$, $R_2$, $R_3$, and $R_4$, which may be the same or different, are alkyl groups with from 1 to 3 carbon atoms. Such compounds include those having molecular weights between about 170 and about 324 with molecular weights of about 170 to about 280 being preferred.

The elasticizing polyol component of compositions formed in accordance with the present invention may be either a diol or a triol, with diols being preferred. Diols useful in accordance with the claimed invention may be polyalkylene ether glycols with molecular weights preferably in the range of about 450 to about 2,000 or more. A particularly preferred diol is a polyethylene ether glycol of molecular weight about 2,000.

The diisocyanate used in compositions of the present invention may be any of the diisocyanate materials conventionally used in formation of polyurethane materials. Aromatic diisocyanates are preferred, and 1,4-diphenylmethane diisocyanate is particularly preferred. The diisocyanate is added in less than stoichiometric amounts such that at least 20% of the urethane-forming reactive sites in the other reactive components remain unreacted. This may be accomplished by including the diisocyanate component in amounts such that the weight ratio of all other reactive components, plasticizer and filler to diisocyanate is from about 4:1 to about 10:1, preferably from about 6:1 to about 7:1.

The unreacted urethane-forming linkages are stabilized through complex formation, as by chelation through interaction with ionic species. Ionic species suitable for stabilization through chelation of quadra-functional reactants of general formula I above, and other similar compounds, include $Ag+$, $K+$, $Cu++$, $Hg++$ and $Ca++$. As above noted, the ionic species responsible for stabilization through complex formation may be added independently or may be provided in the reaction mixture by an organo-metallic urethane-forming catalyst. Suitable urethane-forming organic-metallic catalysts include 2-ethyl-zinc hexanoate, phenyl mercury acetate, phenyl mercury laurate, cobalt octoate, butyl-tin-dilaurate, or the like. When the complex forming materials, ions in the case of chelation, are added from sources other than the catalyst, organic catalysts normally used to catalyze urethane-forming reactions, such as those based on tertiary amines, may be employed.

The reinforcing light-weight filler materials employed in the compositions of the present invention perform a dual function of reducing the density of the material and improving the mechanical strength of the material. Particularly preferred light-weight filler materials include hollow glass spheres, silicon dioxide spheres, such as those formed as fly ash, and sintered silicon dioxide powder. Preferably, such reinforcing filler materials are from about 40 microns to about 700 microns in diameter. Useful filler particle diameters are determined by the fact that both weight and mechanical strength of the composite material decrease with increasing filler particle diameter.

A particularly preferred filler material is fly ash, that is, silicon dioxide spheres, of approximately 72 microns in diameter. Most preferably, the filler material is coated with an adhesion promoting composition which improves the degree of adhesion between the filler and the polyurethane matrix. Adhesion promoting compositions normally used to improve the adhesion of glass to polyurethane materials may be employed in this regard. Polysiloxane adhesion promoters and inorgano-silane coatings are particularly suitable.

Plasticizers useful in the present invention are those which reduce the normal intermolecular forces of the macromolecules and may be selected from those plasticizing materials normally used to plasticize polyurethane elastomers. Suitable plasticizers may be selected from the group consisting of adipate, phosphate and phthalate esters, with dioctyl phthalate being particularly preferred.

The ratio of components employed in forming the compositions of the present invention may be varied within limits to modify the physical properties of the resulting composition. Specifically, the compression set of materials formed in accordance with the present invention may be maintained below 5% and, in the preferred embodiment, may be maintained below about 1.5% by appropriate selection of materials. Compression set may be varied in this regard by varying the cross-link density and the percentage of free urethane-forming reactive sites. Similarly, the recovery time of polyurethane elastomer compositions formed according to the present invention may be maintained between about 10 and about 100 milliseconds. Recovery times between about 15 and about 40 milliseconds are particularly preferred for materials to be used to absorb shock associated with walking, while recovery times in the range of about 15 to about 25 milliseconds are preferred for compositions to be used to absorb shocks associated with running. A preferred general application material has recovery times in the range of about 10 milliseconds to about 40 milliseconds with recovery times between about 20 and about 30 milliseconds being particularly preferred. In some situations where energy absorption is desired, such as in absorbing shocks associated with walking on crutches and the like, recovery times as high as 300 milliseconds may be attained with appropriately adjusted compositions of the present invention. Recovery time is found to vary inversely with the cross-link density.

Materials formed in accordance with the present invention should have a tensile strength of at least 80 psi. Tear strength may be improved by inclusion of woven or nonwoven reinforcing fabrics or fibers made of materials such as nylon. The materials of the present invention should have a Shore 00 Hardness of about 20 to about 70, with the range of about 45 to about 50 being preferred for normal walking or running footwear.

One method of attaining the properties desired in the products of the present invention might be to leave one end of some of the monomer molecules free while cross linking the opposite end. This means that the monomer must be at least a triol. However, the free reactive group, which may be a hydroxyl group, would make the system unstable and would be termed undercured. A tetrol would behave in a similar way unless each monomeric molecule contained, e.g., four available ligand atoms, two of which were located in the terminal groups. If a fifth metal ion capable of accepting two electrons from each of the participating ligand atoms is introduced, a complex is formed and the free end of the molecule is stabilized. The quadra-functional reactant of the present invention may be stabilized in this or a similar manner. However, such a polymer alone would be brittle and weak, and it is therefore necessary to add a linear chain in the form of the elasticizing diol or triol to add toughness.

The maximum quantity of diol or triol present in compositions of the present invention is limited on the one hand by the materials becoming too brittle as diol or triol concentrations decrease. On the other hand, when diol and triol concentrations approach their practical upper limit, the percentage of free hydroxyl groups falls below an acceptable level. Similarly, the polymer becomes more liquid-like in its properties the greater the percentage of urethane-forming reactive groups left unreacted in the final product, and the potential for instability and changes in properties with time increases.

With these relationships in mind, preferred compositions include as the urethane-forming component one part quadra-functional reactant as above defined, about 1-3 parts diol or triol, about 0.2-2 parts filler and 0 to about 0.5 parts plasticizer. A particularly preferred composition includes 1 part tetrol, about 2 parts elasticizing diol, about 0.5 parts filler and about 0.25 parts plasticizer. To this urethane-forming component is added a diisocyanate, preferably an aromatic diisocyanate, in less than stoichiometric amounts, such that the weight ratio of the urethane-forming component as above defined to diisocyanate is in the range of about 4:1 to about 10:1, preferably about 6:1 to about 7:1. It is to be understood, however, that the selection of suitable proportions of materials for application of the teachings of the present invention to a specific problem or environment will be within the capabilities of one having ordinary skill in the art in light of the teachings contained herein. Examples of compositions within the scope of the present invention and the properties resulting from modifications of such compositions appear in the following examples.

EXAMPLE I

To 1 part by weight of a tetrol of general formula I, above, and having a molecular weight of about 200, were added 2 parts of diol (polypropylene glycol; molecular weight about 2,000), 0.5 parts dioctyl phthalate plasticizer, 0.7 parts 1,4-diphenyl methane diisocyanate and 1.0 part glass microspheres (approx. dia. 60 microns). Approximately 0.2% by weight of phenyl mercury dilaurate was added as catalyst. The urethane-forming reaction was allowed to proceed in conventional manner and the resulting polyurethane elastomer composition had a tensile strength measured according to ASTM Specification D-412 of 88. After two days, the material manifested a consistent tensile strength of 90 showing the composition to be stable.

EXAMPLE II

The procedure of Example I was repeated except that microspheres coated with a polysiloxane adhesion promoter were substituted for the uncoated microspheres. The material manifested an initial tensile strength of about 92 which stabilized after about 7 days at 100.

EXAMPLE III

The procedure of Example II was repeated except that polysiloxane coated silicon dioxide microspheres (fly ash of approx. dia. 72 microns) were substituted for the coated microspheres. The initial tensile strength of 94 stabilized at about 101 after about seven days.

EXAMPLE IV

To 1 part by weight of a tetrol of general formula I above, having a molecular weight of about 200, was added 2 parts of diol (polypropylene glycol; molecular weight about 2,000), 0.25 parts dioctyl phthalate plasticizer and 1 part coated fly ash as described in Example III. The urethane-forming component of the mixture was stirred for 3 hours at a pressure of 25 in. of mercury and a temperature of 160° F. To this mixture was added 0.7 parts of 1,4-diphenyl methane diisocyanate. Approximately 0.2% by weight diphenyl mercury dilaurate was added as catalyst. The reaction mixture was stirred for 20 seconds at room temperature. The resulting polyurethane elastomer composition has an initial tensile strength of 125 which stabilized at about 138 after about seven days. The stabilized material had an elongation at break ASTM Specification D-412) of 280%, a tear strength as measured by the Graves test of 85 pounds per lineal inch, no volume change upon treatment with 10% HCl and a 0.5% volume change upon treatment with 5% NaOH. The stabilized polymer showed no decrease in tensile strength upon exposure to 50 parts per million of ozone for 12 hours.

It will be apparent to those skilled in the art that various modifications and variations can be made in the polyurethane elastomer compositions and methods of making and using them in accordance with the present invention. Thus, it is intended that the present invention cover the modifications and variations of this invention provided that they come within the scope of the appended claims and their equivalents.

What is claimed is:

1. A polyurethane elastomer composition having a density of from about 0.4 to about 1 gm/cc, a compression set of less than about 5% and a recovery time of from about 10 to about 100 milliseconds.

2. A polyurethane elastomer composition in accordance with claim 1 wherein said recovery time is from about 15 to about 40 milliseconds.

3. A polyurethane elastomer composition in accordance with claim 1 wherein said recovery time is from about 15 to about 25 milliseconds.

4. A polyurethane elastomer composition in accordance with claim 1 wherein said compression set is less than about 1.5%.

5. A polyurethane elastomer composition in accordance with claim 1 wherein said density is from about 0.6 to less than 1 gm/cc.

6. A polyurethane elastomer composition in accordance with claim 1 wherein said density is from about 0.6 to about 0.7 gm/cc.

7. A polyurethane elastomer composition according to claim 1 containing a light-weight filler material and being the reaction product of
   (a) a urethane-forming component comprising a compound containing at least four urethane-forming reactive sites and capable of forming stable complexes through unreacted urethane-forming reactive sites, an elasticizing polyol selected from the group consisting of diols and triols, and
   (b) a diisocyanate in less than stoichiometric amounts.

8. A polyurethane elastomer composition according to claim 7 wherein a portion of said elasticizing polyol is replaced by a plasticizer.

9. A polyurethane elastomer composition according to claim 7 or 8 wherein said reaction is catalyzed by an added catalyst.

10. A polyurethane elastomer composition according to claim 7 or 8 wherein said unreacted urethane-forming reactive sites are stabilized by chelation.

11. A polyurethane elastomer composition according to claim 10 wherein said chelation is effected by ionic species.

12. A polyurethane elastomer composition according to claim 11 wherein said ionic species are introduced as part of an added catalyst system.

13. A polyurethane elastomer composition according to claim 11 wherein said ionic species are introduced separately from any added catalyst system.

14. A polyurethane elastomer composition according to claim 9 wherein said catalyst is an organic catalyst.

15. A polyurethane elastomer composition according to claim 14 wherein said unreacted urethane-forming sites are stabilized by chelation with ionic species from a source other than the added catalyst.

16. A polyurethane elastomer composition according to claim 12 wherein the catalyst is selected from the group consisting of 2-ethyl-zinc hexanoate, phenyl mercury acetate, phenyl mercury laurate, cobalt octoate or butyl-tin-dilaurate.

17. A polyurethane elastomer composition according to claim 15 wherein said ionic species are selected from the group consisting of Ag+, K+, Cu++, Hg++ and Ca++.

18. A polyurethane elastomer composition according to claim 7 or 8 wherein said compound containing at least four urethane-forming reactive sites is a tetrol.

19. A polyurethane elastomer composition according to claim 18 wherein said polyurethane elastomer composition is the reaction product of about 1 part tetrol, about 1-3 parts elasticizing polyol, about 0.2-2 parts filler, about 0-0.5 parts plasticizer and aromatic diisocyanate present in amounts such that the weight ratio of all other reactive components, plasticizer and filler to diisocyanate is from about 4:1 to about 10:1.

20. A polyurethane elastomer composition according to claim 19 wherein the urethane-forming component of said polyurethane elastomer composition comprises about 1 part tetrol, about 2 parts elasticizing diol, about 0.5 parts filler and about 0.25 parts plasticizer.

21. A polyurethane elastomer composition according to claim 7 or 8 wherein said elasticizing polyol is a diol.

22. A polyurethane elastomer composition according to claim 21 wherein said diol is a polyalkylene ether glycol with molecular weight from about 450 to about 2000.

23. A polyurethane elastomer composition according to claim 7 or 8 wherein said urethane-forming reactive sites are selected from the group consisting of hydroxyl groups and carboxyl groups.

24. A polyurethane elastomer composition according to claim 18 wherein the tetrol has a molecular weight from about 170 to about 450.

25. A polyurethane elastomer composition according to claim 20 wherein said tetrol has a molecular weight of about 200 and said diol has a molecular weight of about 2000.

26. A polyurethane elastomer composition according to claim 8 wherein said plasticizer reduces the normal intermolecular forces of the macromolecules and is selected from the group consisting of adipate, phosphate and phthalate esters.

27. A polyurethane elastomer composition according to claim 7 or 8 wherein said filler material is about 40 to about 700 microns in diameter and is selected from the group consisting of hollow glass spheres, silicon dioxide spheres, fly ash and sintered silicon dioxide powder.

28. A polyurethane elastomer composition according to claim 27 wherein said filler material is coated with an adhesion promoter.

29. A polyurethane elastomer composition according to claim 25 wherein said filler material is coated silicon dioxide fly ash spheres about 70 microns in diameter and said plasticizer is dioctyl phthalate.

30. A polyurethane elastomer composition according to claim 7 or 8 wherein said ratio is from about 6:1 to about 7:1.

31. A polyurethane elastomer according to claim 24 wherein said tetrol is of the following formula:

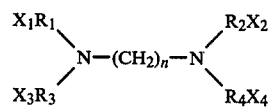

wherein n is an integer of from 1 to 4; $X_1$, $X_2$, $X_3$, and $X_4$, are hydroxyl groups; and $R_1$, $R_2$, $R_3$, and $R_4$, which may be the same or different, are alkyl groups with from 1 to 3 carbon atoms.

32. A polyurethane elastomer composition according to claim 7 or 8 wherein at least 20% of available reactive sites remain unreacted.

33. A polyurethane elastomer composition according to claim 32 wherein said unreacted sites are stabilized by chelation.

34. A polyurethane elastomer composition according to claim 30 wherein said diisocyanate is 4,4'-diphenylmethane diisocyanate.

35. A process for forming a polyurethane elastomer composition comprising
(a) mixing about 1 part of a compound having at least four urethane-forming reactive sites and capable of forming stable complexes through unsatisfied urethane-forming reactive sites, about 1 to about 3 parts of an elasticizing polyol selected from the group consisting of diols and triols, about 0.2 to about 2 parts of light weight reinforcing filler selected from the group consisting of hollow glass spheres, silicon dioxide spheres, fly ash, and sintered silicon dioxide powder, and from 0 to about 0.5 parts plasticizer;
(b) adding a diisocyanate in amounts such that the ratio of the weight of all other reactive components, filler and plasticizer to diisocyanate is in the range of from about 8.5:1 to about 11:1;
(c) allowing formation of urethane linkages involving less than about 80% of the urethane-forming reactive sites on said compound having at least four such reactive sites; and
(d) stabilizing the remaining urethane-forming reactive sites by formation of complexes such that the cured product has a density of from about 0.4 to 1 gm/cc, a compression set of less than about 5% and a recovery time of from about 10 to about 100 milliseconds.

36. An article of footwear having an energy absorbing element formed from the polyurethane elastomer of claim 7 or 8.

37. A shock absorbing insole formed from the polyurethane elastomer of claim 7 or 8.

38. A constrained layer vibration damper comprising a laminate of relatively rigid exterior layers and an interior layer formed from the polyurethane elastomer of claim 7 or 8.

* * * * *